US012012693B2

(12) United States Patent
Varnava et al.

(10) Patent No.: US 12,012,693 B2
(45) Date of Patent: Jun. 18, 2024

(54) METHOD OF MANUFACTURING AN ENDLESS LOOP

(71) Applicant: Cortland Industrial LLC, Dallas, TX (US)

(72) Inventors: Thanasis Varnava, Houston, TX (US); Ryan Murphy, Houston, TX (US); Ahmed Tagnaouti Moumnani, Houston, TX (US); Wesley Conger, Houston, TX (US)

(73) Assignee: Cortland Industrial LLC, Dallas, TX (US)

( * ) Notice: Subject to any disclaimer, the term of this patent is extended or adjusted under 35 U.S.C. 154(b) by 242 days.

(21) Appl. No.: 17/625,966

(22) PCT Filed: Jul. 10, 2020

(86) PCT No.: PCT/US2020/041557
§ 371 (c)(1),
(2) Date: Jan. 10, 2022

(87) PCT Pub. No.: WO2021/007497
PCT Pub. Date: Jan. 14, 2021

(65) Prior Publication Data
US 2022/0243393 A1 Aug. 4, 2022

Related U.S. Application Data

(60) Provisional application No. 62/873,041, filed on Jul. 11, 2019.

(51) Int. Cl.
*D07B 7/16* (2006.01)
*B66C 1/18* (2006.01)
(Continued)

(52) U.S. Cl.
CPC ............. *D07B 7/165* (2013.01); *D07B 1/025* (2013.01); *D07B 1/18* (2013.01); *B66C 1/18* (2013.01);
(Continued)

(58) Field of Classification Search
CPC .. D07B 7/165; D07B 5/04; D07B 1/18; B66C 1/12
(Continued)

(56) References Cited

U.S. PATENT DOCUMENTS 2,260,719 A * 10/1941 Merrifield ................ F16G 9/00 156/441
3,786,623 A 1/1974 Eliasson
(Continued)

FOREIGN PATENT DOCUMENTS

DE 948040 C * 8/1956 ............. D07B 7/167
DE 4222935 A1 * 1/1994 .............. B21F 45/00
(Continued)

OTHER PUBLICATIONS

International Search Report with Written Opinion for related Application No. PCT/US2020/041557 dated Nov. 2, 2020 (7 Pages).
(Continued)

*Primary Examiner* — Patrick J. Lynch
(74) *Attorney, Agent, or Firm* — Andrus Intellectual Property Law, LLP

(57) ABSTRACT

A method for manufacturing a rope structure comprising providing, around a first roller and a second roller, a loop including a plurality of twisted strands. The method further comprising feeding a plurality of body strands onto the loop, feeding including, with the plurality of body strands connected to the loop, moving the loop about the first roller and the second roller to cause the body strands to lay and be twisted on the plurality of twisted strands.

20 Claims, 15 Drawing Sheets

(51) Int. Cl.
*D07B 1/02* (2006.01)
*D07B 1/18* (2006.01)

(52) U.S. Cl.
CPC ................ *D07B 2201/1044* (2013.01); *D07B 2201/2036* (2013.01); *D07B 2205/2014* (2013.01); *D07B 2205/2042* (2013.01); *D07B 2205/205* (2013.01)

(58) Field of Classification Search
USPC ................................................ 57/201; 294/74
See application file for complete search history.

(56) References Cited

U.S. PATENT DOCUMENTS

| | | | | |
|---|---|---|---|---|
| 3,808,078 | A * | 4/1974 | Snellman | B62D 55/253 273/DIG. 7 |
| 3,899,206 | A * | 8/1975 | Miura | D04C 3/48 294/74 |
| 4,354,704 | A | 10/1982 | Nayerjak | |
| 4,843,807 | A * | 7/1989 | von Danwitz | D07B 7/165 87/8 |
| 4,850,629 | A | 7/1989 | St. Germain | |
| 5,561,973 | A | 10/1996 | St. Germain | |
| 5,651,572 | A | 7/1997 | St. Germain | |
| 5,651,573 | A | 7/1997 | St. Germain | |
| 6,352,603 | B1 | 3/2002 | Bryant | |
| 7,240,475 | B2 | 7/2007 | Smeets et al. | |
| 7,568,333 | B2 | 8/2009 | St. Germain | |
| 7,661,737 | B2 | 2/2010 | St. Germain | |
| 7,744,138 | B2 | 6/2010 | St. Germain | |
| 7,926,859 | B2 | 4/2011 | St. Germain | |
| 8,322,765 | B2 | 12/2012 | St. Germain | |
| 9,003,757 | B2 * | 4/2015 | Mozsgai | D07B 1/18 57/201 |
| 9,145,984 | B2 | 9/2015 | St. Germain, Jr et al. | |
| 9,187,298 | B2 | 11/2015 | DeSoo et al. | |
| 9,293,028 | B2 | 3/2016 | St. Germain | |
| 9,589,444 | B1 | 3/2017 | St. Germain et al. | |
| 9,892,616 | B2 | 2/2018 | St. Germain et al. | |
| 10,113,267 | B2 | 10/2018 | Riggs et al. | |
| 2006/0261617 | A1 | 11/2006 | St. Germain | |
| 2008/0157549 | A1 | 7/2008 | St. Germain | |
| 2008/0282664 | A1 | 11/2008 | Chou et al. | |
| 2009/0107573 | A1 | 4/2009 | St. Germain | |
| 2009/0108603 | A1 | 4/2009 | St. Germain | |
| 2009/0260735 | A1 * | 10/2009 | Sasabe | D07B 7/165 152/540 |
| 2011/0169285 | A1 | 7/2011 | St. Germain | |
| 2011/0272956 | A1 * | 11/2011 | Bae | B66C 1/12 57/362 |
| 2013/0319565 | A1 | 12/2013 | St. Germain, Jr et al. | |
| 2014/0264214 | A1 | 9/2014 | DeSoo et al. | |
| 2015/0147509 | A1 | 5/2015 | Bosman et al. | |
| 2015/0197408 | A1 | 7/2015 | St. Germain et al. | |
| 2015/0199893 | A1 | 7/2015 | St. Germain | |
| 2017/0109996 | A1 | 4/2017 | St. Germain et al. | |
| 2017/0254002 | A1 | 9/2017 | Riggs et al. | |

FOREIGN PATENT DOCUMENTS

| | | | | |
|---|---|---|---|---|
| DE | 202013102474 | U1 * | 9/2013 | D03D 1/0005 |
| EP | 281287 | A1 | 9/1988 | |
| EP | 3029197 | | 6/2016 | |
| EP | 3165670 | | 5/2017 | |
| GB | 567406 | | 2/1945 | |
| KR | 100868870 | B1 * | 11/2008 | D07B 7/165 |
| KR | 101019909 | B1 * | 3/2011 | D07B 7/165 |
| WO | WO2014043136 | A1 | 3/2014 | |

OTHER PUBLICATIONS

Partial Supplementary European Search Report from corresponding European Patent Application No. 20837556.8 dated Nov. 16, 2023.

* cited by examiner

METHOD OF MANUFACTURING AN ENDLESS LOOP

RELATED APPLICATION

The present application claims the benefit of U.S. Provisional Patent Application No. 62/873,041, filed Jul. 11, 2019, the entire contents of which are hereby incorporated by reference.

FIELD

The present invention generally relates to a method for manufacturing an endless loop, such as a tether, a sling, etc., and, more particularly, to a method of cabling an endless loop.

SUMMARY

Various methods of manufacturing an endless loop, such as tethers and slings, are known. Factors to consider in the manufacturing methods include the cost, weight, and cross-sectional diameter of the endless loop while providing adequate operational characteristics (e.g., strength and flexibility) for a particular application. The breaking tenacity, or force to break with respect to linear density, of the endless loop is generally desired to be high. Also, having a low utilization variance between slings manufactured with the same processes is desirable.

Traditional manufacturing methods of slings and tethers include selecting a strand material, a number of strands, and a cover material to target the operational characteristics (e.g., the strength and flexibility needs) of a given application. However, in some applications, simply selecting a certain combination of these criteria are not enough to meet the desired mechanical properties of the sling or tether. These slings or tethers may break before reaching the desired breaking strength and are susceptible to utilization variance.

In one independent aspect, a method of manufacturing an endless loop (e.g., a tether, a sling, etc.) may be provided. The method may generally include providing, around a first roller and a second roller, a loop including a plurality of twisted strands; and feeding a plurality of body strands onto the loop, feeding including, with the plurality body strands connected to the loop, moving the loop about the first roller and the second roller to cause the body strands to lay and be twisted on the plurality of twisted strands.

In another independent aspect, a method of manufacturing an endless loop may generally include forming, around a first roller and a second roller, a loop including a plurality of loops strands, forming including applying a twist to the plurality of loop strands to provide a plurality of twisted strands; and feeding a plurality of body strands onto the loop, feeding including, with the plurality body strands connected to the loop, moving the loop about the first roller and the second roller to cause the body strands to lay and be twisted on the plurality of twisted strands.

In yet another independent aspect, a method of manufacturing an endless loop may generally include positioning, around a first roller and a second roller, a plurality of twisted strands; and, with the plurality of twisted strands formed in a loop, feeding a plurality of body strands onto the loop, feeding including, with the plurality body strands connected to the loop, moving the loop about the first roller and the second roller to cause the body strands to lay and be twisted on the plurality of twisted strands.

Other independent aspects of the disclosure may become apparent by consideration of the detailed description, claims and accompanying drawings.

DETAILED DESCRIPTION

Figure 1:
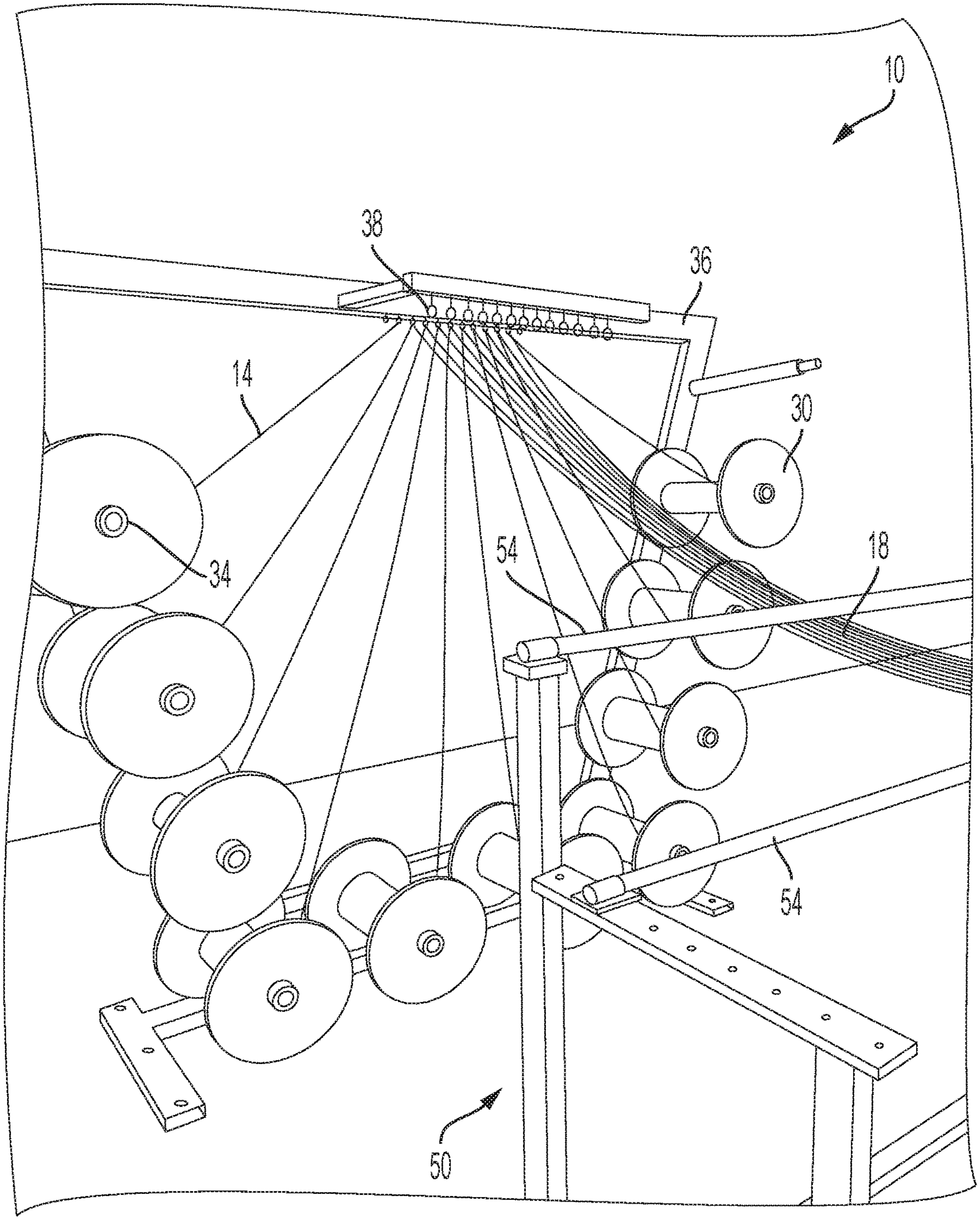
FIG. 1 is a perspective view of the supply assembly for an endless loop manufacturing machine and including the bobbin structure and fish ladder.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of “including” and “comprising” and variations thereof as used herein is meant to encompass the items listed thereafter and equivalents thereof as well as additional items. Use of “consisting of” and variations thereof as used herein is meant to encompass only the items listed thereafter and equivalents thereof. Unless specified or limited otherwise, the terms “mounted,” “connected,” “supported,” and “coupled” and variations thereof are used broadly and encompass both direct and indirect mountings, connections, supports, and couplings.

Relative terminology, such as, for example, “about”, “approximately”, “substantially”, etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression “from about 2 to about 4” also discloses the range “from 2 to 4”. The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is “configured” in a certain way is configured in at least that way but may also be configured in ways that are not listed.

A method for cabling an endless loop, such as a tether, a sling, etc., is illustrated in the figures. Generally, a base including a plurality of base strands with a selected twist rate is provided on a winding machine and arranged in a loop extending about spaced apart rollers. The base loop may be formed on the machine with the base strands being fed onto the machine and secured in a loop and with a twist being applied to the strands on the machine. Alternatively, a pre-formed base with twisted strands may be positioned on the machine (e.g., as an elongated member secured in a loop around the rollers or as a pre-formed loop positioned around the rollers).

In another alternative, the base strands and twisted strands may be formed as braided strands. In yet another alternative, the pre-formed base with twisted strands may be formed of braided subcomponents.

With the loop with twisted strands on the machine, additional rope material is laid on the loop. Body strands (e.g., strands formed continuously with the base strands, separate strands connected to the base loop, combinations thereof) are drawn into the machine by driving the base loop around the rollers (e.g., with a drive roller). The body strands lay on the underlying twisted strands (e.g., the base strands or previously-laid body strands), and, as the body strands are added, the twist is applied to this subsequently-added, following rope material. As the structure of laid twisted strands rotates about the rollers, the laid twisted structure also spins about its axis, causing the following body strands to follow a helical path onto the laid structure so that the twist is applied.

When the desired amount of rope material has been added to the laid twisted structure, the endless loop with twisted strands is formed. For a sling, the free end of each body strand is secured to a free end of a base strand (e.g., by a knot or other securing method or device). For a tether, the free end of each body strand is also secured to a free end of a base strand (e.g., by a knot or other securing method or device), and eyes or other connection points are provided through whipping applied to the endless loop.

A cover may be provided over the endless loop, and, for an endless loop with a discontinuity in the rope strands (e.g., a connection between the ends of the body and base strands, a connection of the body strands to the loop, etc.), an indicator to identify the discontinuity is provided on the cover. The indicator may also indicate other mechanical properties of the endless loop.

FIG. 1 illustrates a supply assembly 10 configured to supply strands 14, 18 (up to ten strands in the illustrated construction) to a machine 22. The machine 22 may be any round sling machine (or machine capable of forming endless loops from a plurality of strands). The machine 22 is operable to move the strands 14, 18 and on which the strands 14, 18 are cabled to manufacture an endless loop 144 (see FIG. 11) for use in a tether 24, a sling 26, etc.

Each strand 14, 18 is stored on a bobbin 30, and each bobbin 30 engages a pin 34 mounted on a supply stand 36. The bobbins 30 are rotatable to allow the strand 14, 18 to be pulled from the bobbin 30 when tension is applied to an end of the strand 14, 18.

Each strand 14, 18 extends from a bobbin 30 through a loophole 38 without interfering with the strands 14, 18 on the other bobbins 30. After passing through the loopholes 38, the ends of the strands 14, 18 may be secured by an end securing mechanism 42 (e.g., a knot, a zip tie, a splice, etc.).

Each strand 14, 18 is formed of fiber material such as, without limitation, a gel-spun ultra-high-molecular-weight polyethylene (UHMWPE) (for example, Dyneema® available from DSM Dyneema B.V., the Netherlands), a recrystallized high modulus polyethylene (for example, Plasma®), a liquid crystal polyester (LCP; for example, Vectran® available from Kuraray Co., Japan), a gel-spun polyethylene (for example, Spectra® available from Honeywell International, Inc., New Jersey, U.S.A.), a para-aramid (for example, Kevlar® available from DuPont, Delaware, U.S.A. or Twaron® available from Teijin Aramid B.V., The Netherlands), a para-aramid copolymer (for example, Technora® available from Teijin Aramid B.V.), a polyamide (nylon), a polyester, or the like or combinations thereof. The fibers of the strands 14, 18 may have a polyurethane finish, although other finishes may alternatively be used.

Figure 2:
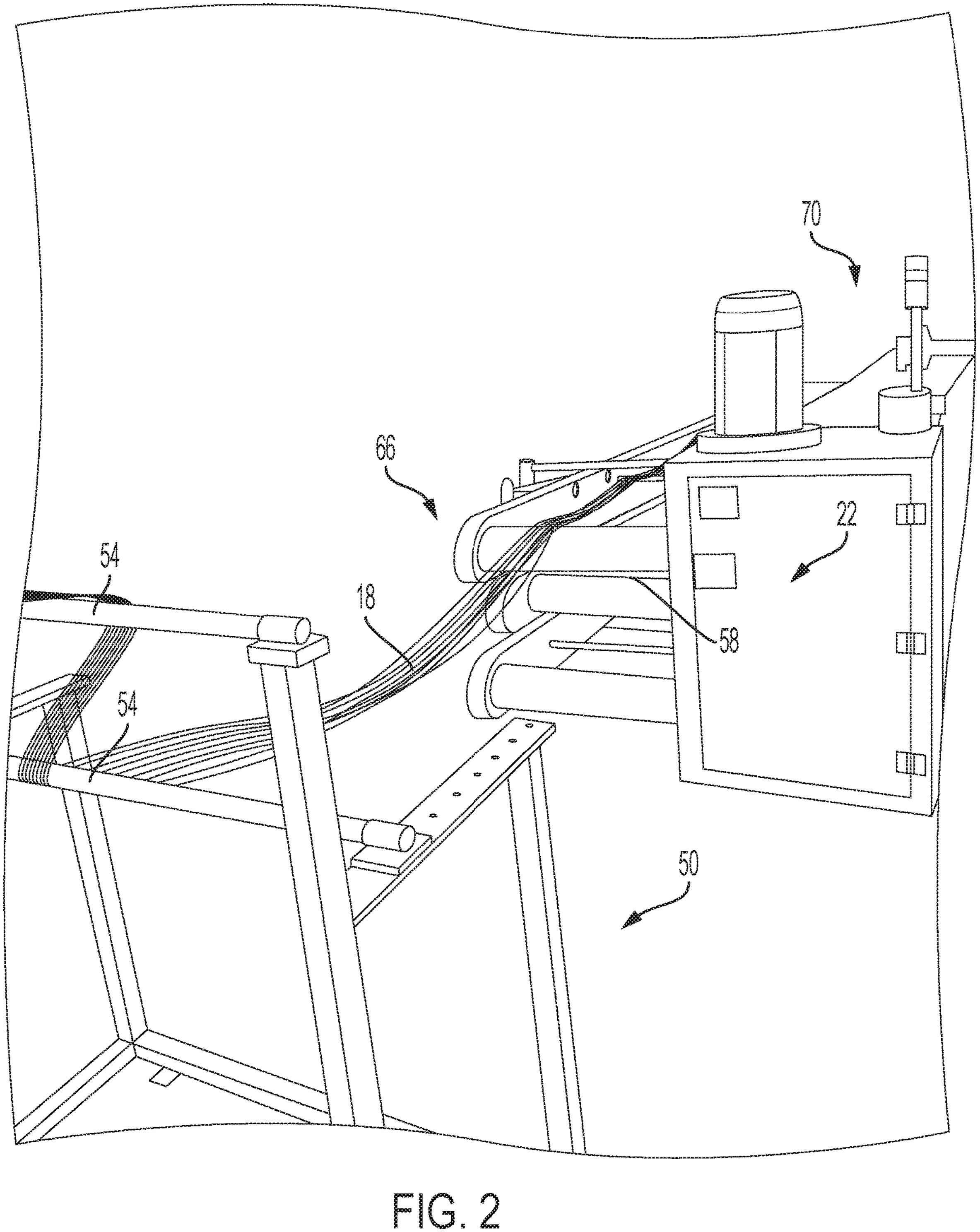
FIG. 2 is a perspective view of base strands being extended beyond the drive roller toward the driven roller.

The supply assembly 10 also includes a “fish ladder” 50 including two offset stationary rods 54 which contact, tension, and reduce bunching of the strands 14, 18. As shown in FIG. 2, the rods 54 of the fish ladder 50 are substantially parallel to a drive roller 58 at the proximal end 66 of the machine 22. In other embodiments (not shown), the drive roller 58 may be located at a distal end 70 of the machine 22.

The strands 14 initially placed on the machine 22 (at least two strands 14) are base strands 14 of the endless loop 144 to be formed, as shown in FIGS. 2-8, in a loop and with a desired twist. In other arrangements (not shown), different strands (e.g., leader lines) may provide the base strands 14.

In still other arrangements (not shown), the base strands 14 may be provided by a pre-looped structure placed on the machine 22.

As described below in more detail, the strands 18 provide additional rope material laid on the loop. The body strands 18 may be formed continuously with the base strands 14 (as shown in the illustrated embodiment), separate strands 18 connected to the base loop, and combinations thereof. The body strands 18 will be laid on the underlying twisted strands (e.g., the base strands 14 or previously-laid body strands 18).

In another embodiment (not shown), the base strands 14 and the body strands 18 may also be braided structures that are fed into the machine 22. In this embodiment, a plurality of braided ropes act as subcomponents to allow the body strands 18 to lay on the braids of the base strands 14.

Figure 3:
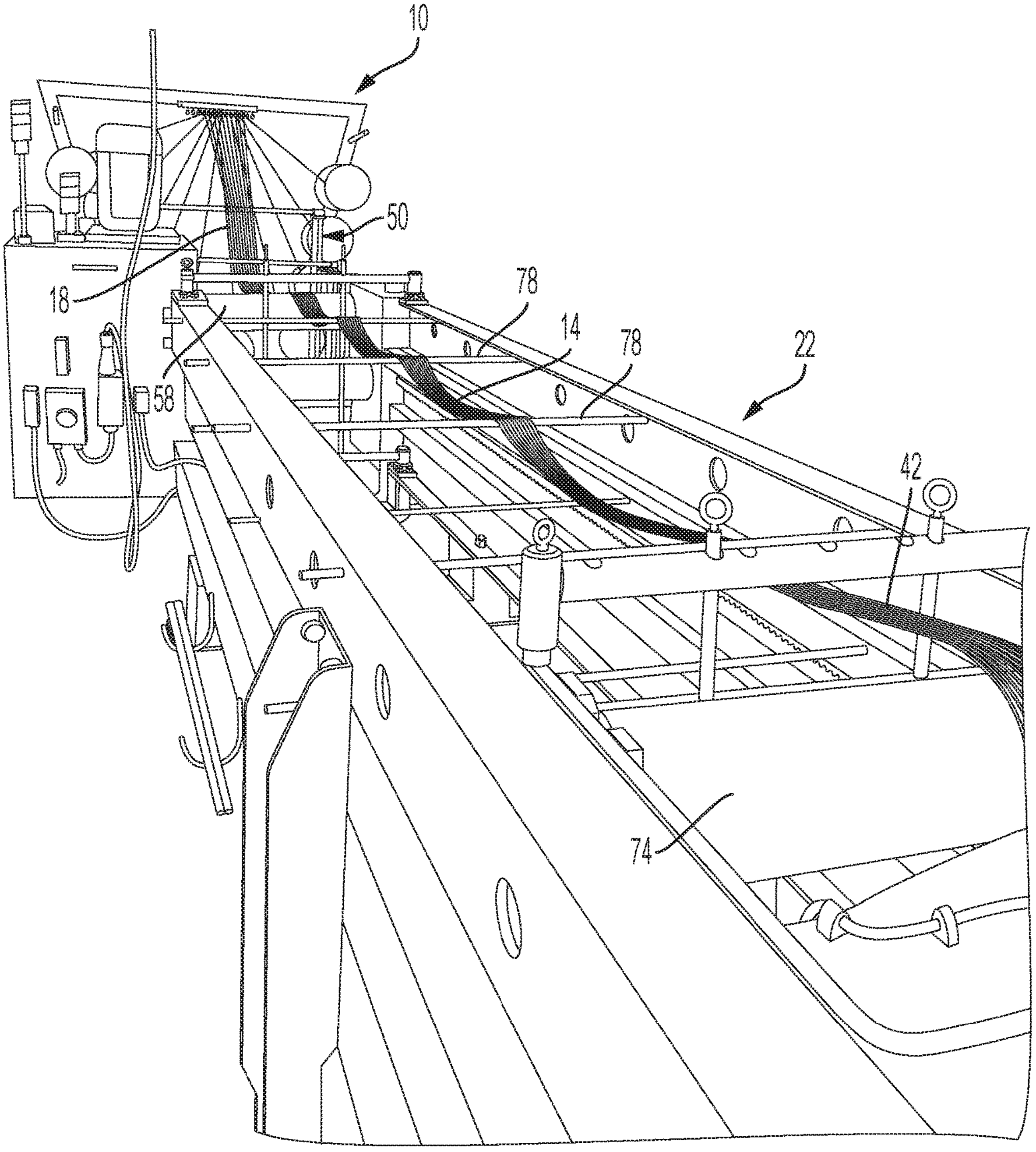
FIG. 3 is a perspective view of the base strands extending to the driven roller.

As shown in FIG. 3, the ends of the base strands 14 initially extend to a driven roller 74 at the distal end 70 of the machine 22. The strands 14 (and, eventually, the body strands 18) rest on support rods 78 to limit sagging which may introduce unnecessary tensile forces to the strands 14 (and, eventually, the body strands 18).

Figure 4:
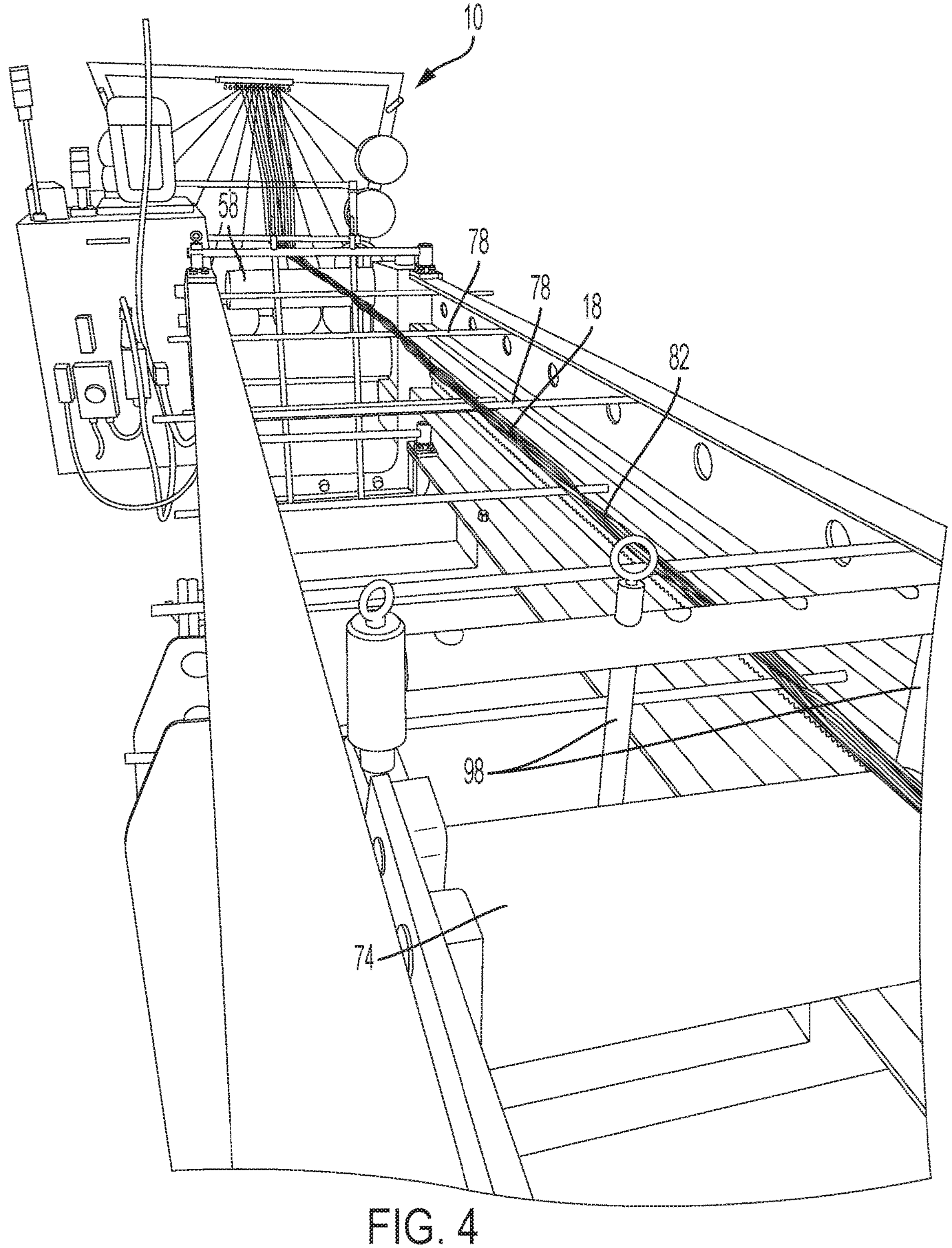
FIG. 4 is a perspective view of the base strands being twisted.

As shown in FIG. 4, a twist 82 is applied to the base strands 14. One twist 82, which also may be known as a turn, is defined as one full revolution of a strand 14, 18 about a longitudinal axis of the bundle of strands 14, 18. The strands 14, 18 may be twisted a number of times to achieve a desired number of twists per unit length of the strands 14, 18 (e.g., a twist rate).

The twist rate applied to the base strands 14 (and, eventually the body strands 18) depends on the desired application and the desired mechanical properties of the sling 26 such as, for example, sling strength and utilization variance, and may also influence other mechanical properties of the sling 26. In general, a twist rate of about 0.8 to about 1.5 twists per meter may be desired for the endless loop 144. In the illustrated embodiment, a twist rate of about 1.0 twist per meter (e.g., a right hand twist) is applied (e.g., by hand) to the base strands 14. In other embodiments (not shown), the twist rate may be lower or higher than the range 0.8 to 1.5 twists per meter.

In applying the twists to the base strands 14 for the endless loop 144, the distance between the supply assembly 10 and the drive roller 58 is also taken into account. For example, to manufacture a ten meter long sling 26, with a twist rate of 1.0 twist per meter, and with two meters between the fish ladder 50 and the drive roller 58, twelve twists 82 are applied to the base strands 18.

Figure 5:
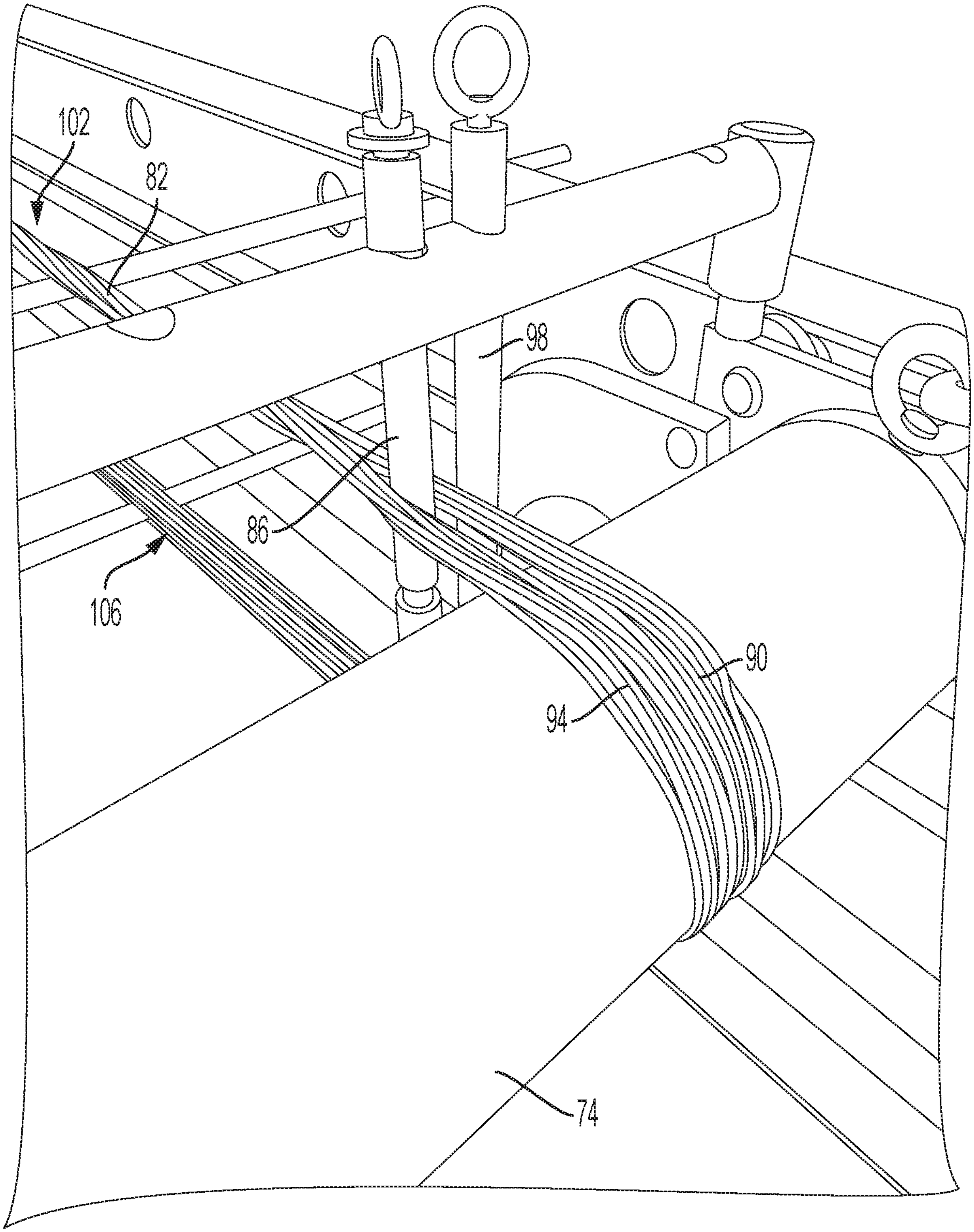
FIG. 5 is a perspective view of the twisted base strands after inserting the rod between the base strands and extending the downstream end of the base strands toward the drive roller.

As shown in FIG. 5, a temporary rod 86 is placed between the twisted base strands 14 to separate the base strands 14 into two sections 90, 94 downstream of the temporary rod 86. This temporary rod 86 prevents the twists 82 from migrating or untwisting while the base strands 14 are extended around the driven roller 74 and back towards the drive roller 58 at the proximal end 66 of the machine 22.

The base strands 14 engage and extend around the driven roller 74 and extend towards the drive roller 58. Alignment rods 98 are provided adjacent to each roller 58, 74 to align the base strands 14 and later-supplied strands 18 within the machine 22.

Figure 6:
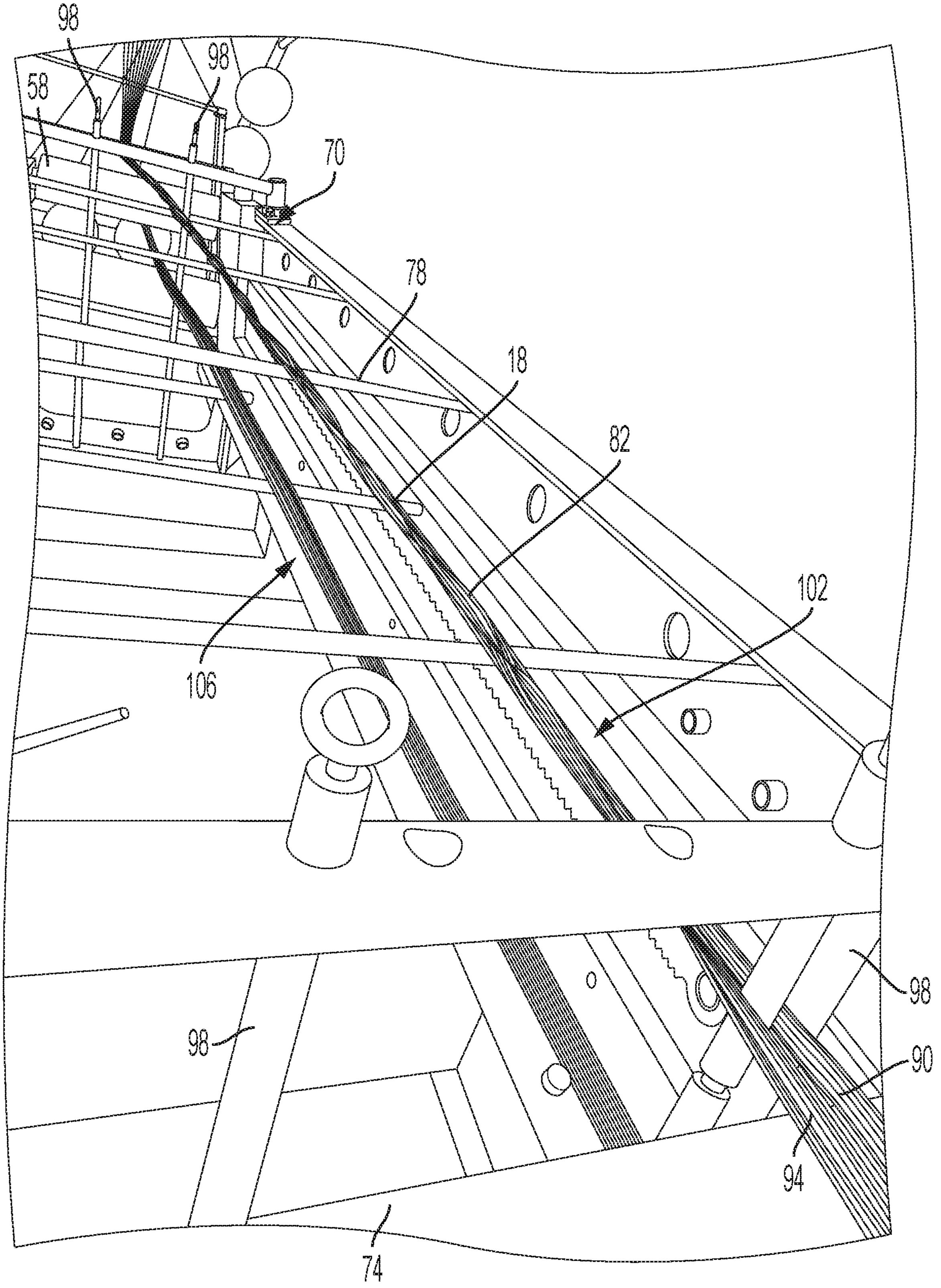
FIG. 6 is a perspective view of the base strands before twisting the downstream section of base strands.

FIG. 6 illustrates the base strands 14 having a number of twists 82 in a portion 102 upstream of the temporary rod 86 and not having any twists in a portion 106 downstream from the temporary rod 86. Both the upstream portion 102 and the downstream portion 106 are supported by the support rods 78 to prevent sagging of the base strands 14 (and, eventually, the body strands 18).

Figure 7:
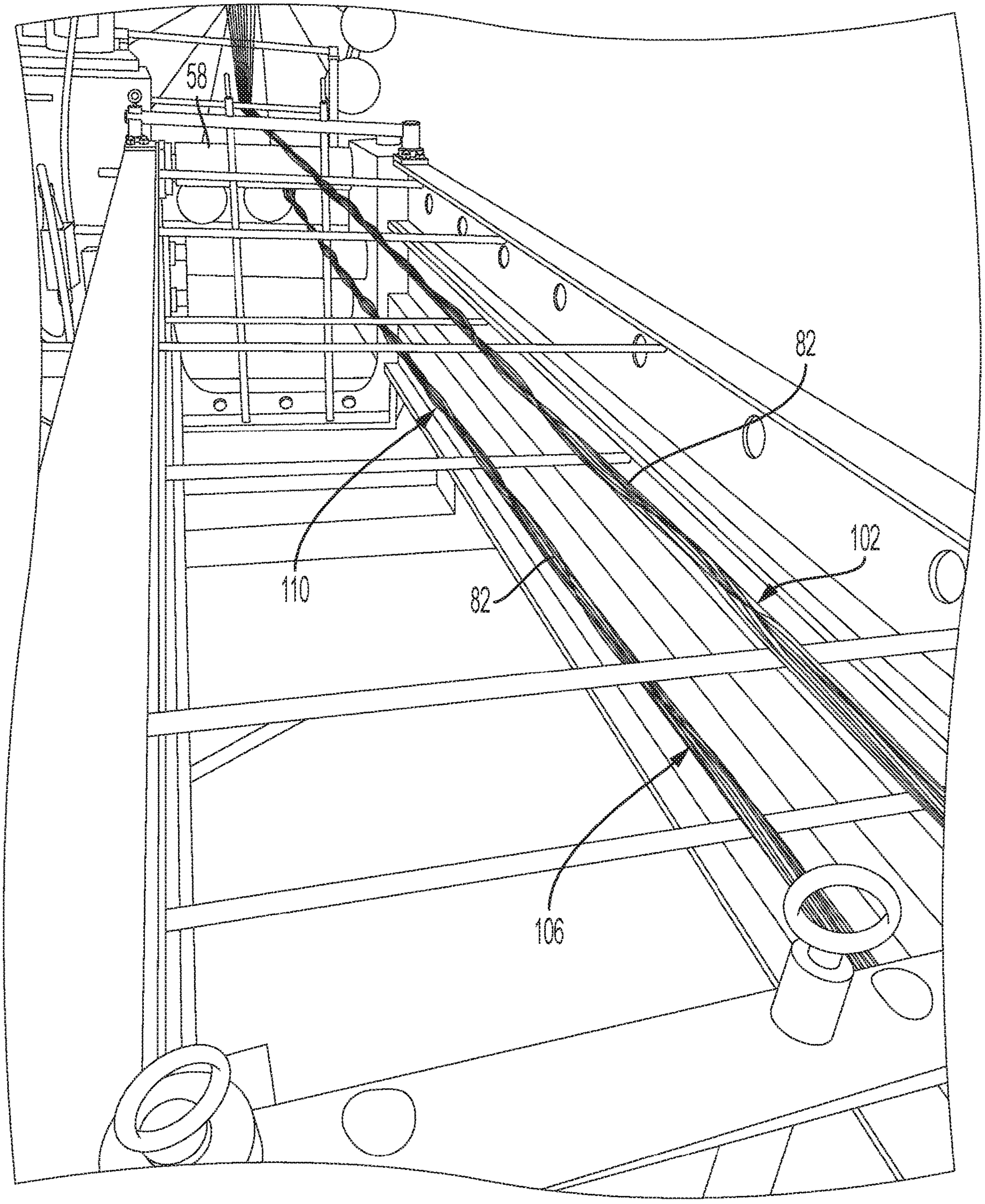
FIG. 7 is a perspective view of the base strands after twisting the downstream section of the base strands.

As shown in FIG. 7, twists 82 (e.g., ten twists for a ten-meter sling 26) are applied to the downstream portion 106 of the base strands 14. The twist rate in the upstream portion 102 and in the downstream portion 106 of the base strands 14 is the same or substantially the same to provide a consistent number of twists 82 along the length of the base strands 14 which will promote an even distribution of tensile loads throughout the endless loop 144 during use.

Figure 8:
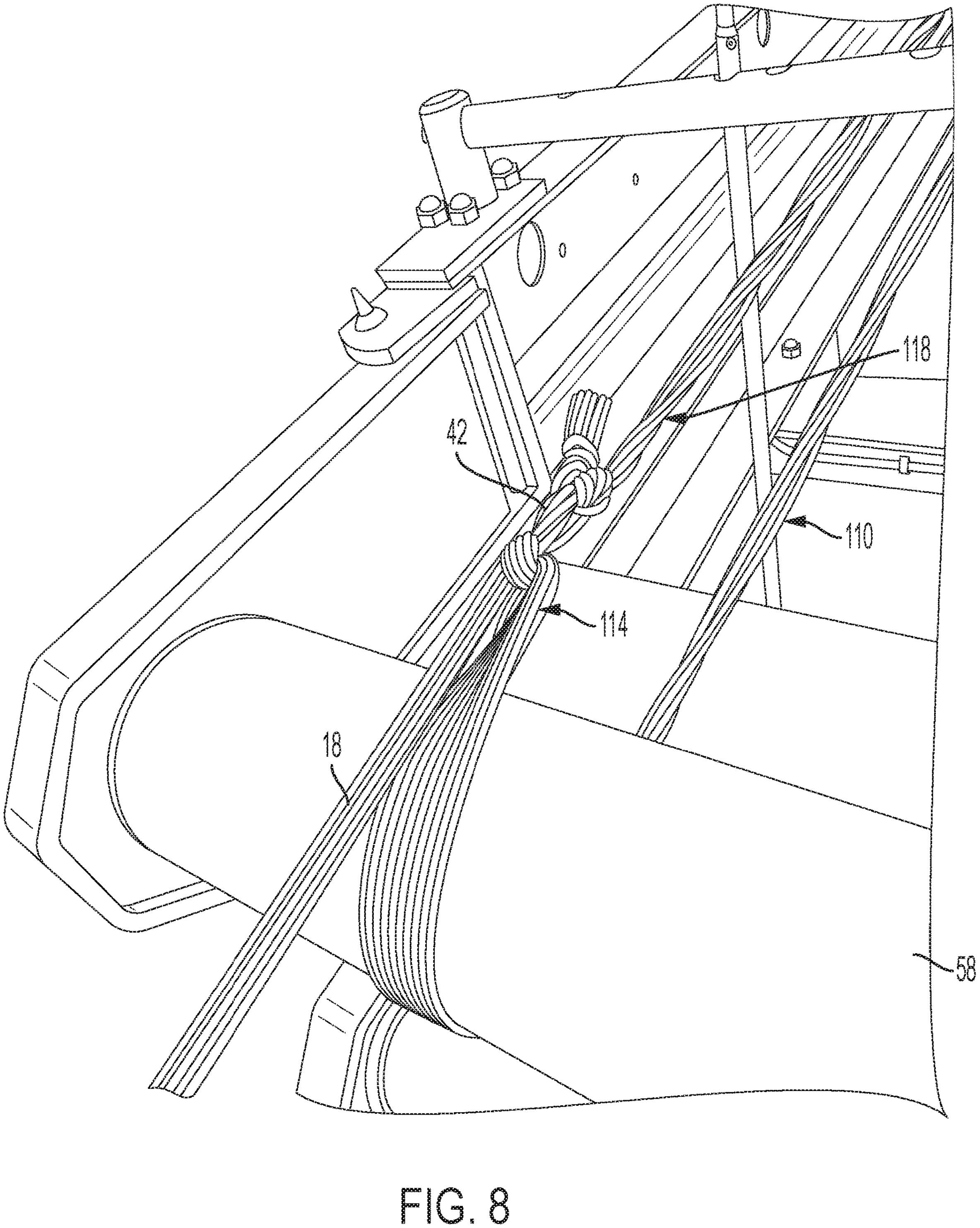
FIG. 8 is a perspective view of a connection (e.g., a knot) between the end of the base strands to form a base loop and between the body strands to be laid and the base loop.

As shown in FIG. 8, the end securing mechanism 42 and the ends of the base strands 14 extend around the drive roller 58, and the base strands 14 are secured in a loop (e.g., with a knot 42 or other securing process or device) around the rollers 58, 74. At this point, the twisted base strands 14 are defined as a base or core 110 of the endless loop 144. In the illustrated embodiment, the core 110 has a first end 114 which includes the end securing mechanism 42 and the ends of the base strands 14, and a second end 118 to which the ends of the base strands 14 are attached.

In other embodiments (not shown), the core 110 may be on a different machine or in accordance with a different process. For example, the core 110 may include pre-twisted base strands (not shown) positioned on the machine 22. In some constructions (not shown), the core 110 may include an inner core that is not twisted and an outer core twisted about the inner core. These pre-twisted strands may be formed into a loop on the machine 22 or may be pre-formed in a loop and then positioned on the machine 22.

As also shown in FIG. 8, the body strands 18 are connected to the core 110. In the illustrated embodiment, the body strands 18 are formed continuously with the base strands 14 to be "connected" to the core 110. In other embodiments (not shown), the body strands 18 may be separate from the base strands 14 and connected (e.g., by a knot 42 or other securing method or device) to the core 110 (e.g., each body strand 18 being connected to a corresponding individual base strand 14). In still other constructions (not shown), some of the body strands 18 may be formed continuously with corresponding base strands 14 while other body strands 18 may be separate from and connected to the core 110 (e.g., to a corresponding individual other base strand 14).

Figure 9:
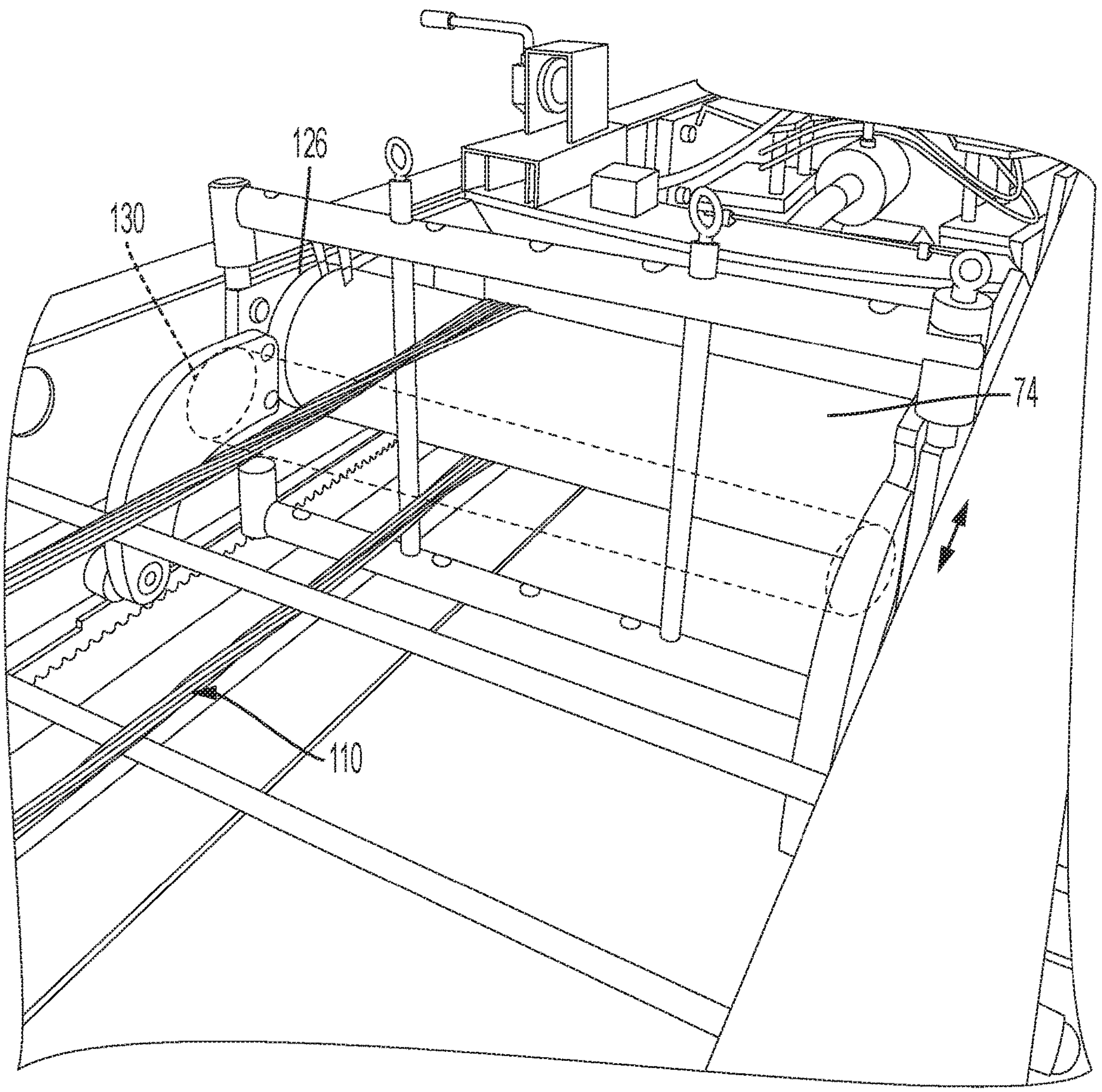
FIG. 9 is a perspective view illustrating a position of the driven roller being adjusted relative to the drive roller to adjust tension on the base loop.

FIG. 9 illustrates the temporary rod 86 removed from the core 110, and the driven roller 74 adjusted to an extended position 126 away from the drive roller 58 to adjust the tension in the core 110. Increased tension in the core 110 allows the drive roller 58 to impart motion in the core 110 when the drive roller 58 is turned by the machine 22. Additionally, the extended position 126 of the driven roller 74 is chosen such that in the extended position 126, the circumference of the core 110 substantially matches the desired or target circumference of the sling 26.

Figure 10:
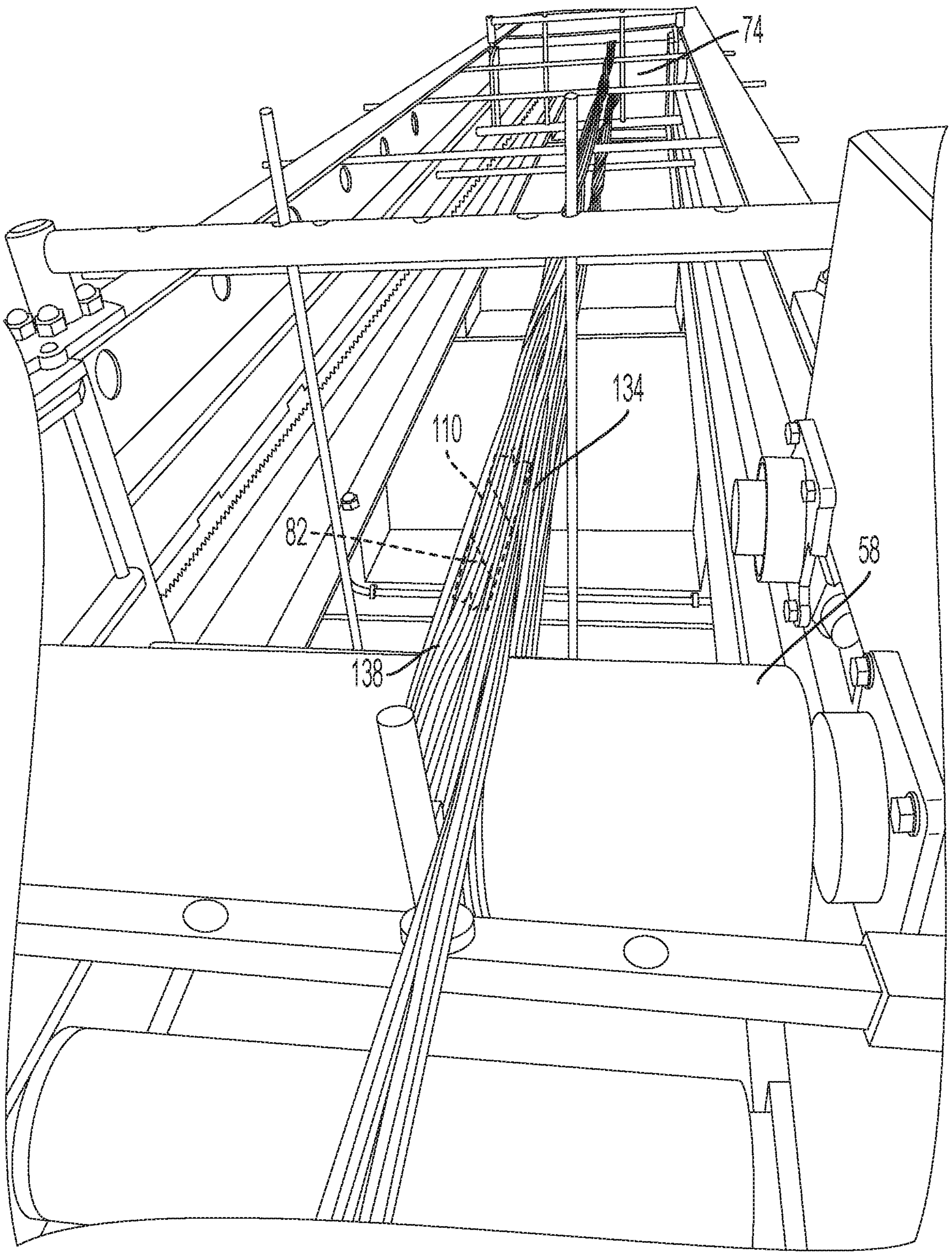
FIG. 10 is a perspective view illustrating the laying of the body strands on the twisted strands.

As shown in FIG. 10, the core 110 formed of base strands 14 having twists 82, is disposed around the drive roller 58 and the driven roller 74, and the body strands 18 are connected to the core 110. The drive roller 58 is driven by the machine 22 such that at least one additional strand (a body strand 18) is introduced to and follows the twist 82 of the core 110. Sufficient additional rope material (body strand(s) 18) and the core 110 together form the endless loop 144.

In operation, the drive roller 58 is driven to rotate the core 110 about the drive roller 58 and the driven roller 74. Rotation of the core 110 along with the securing knot 42 force the body strands 18 to follow the rotation of the core 110 and be drawn into the machine 22.

Figure 11:
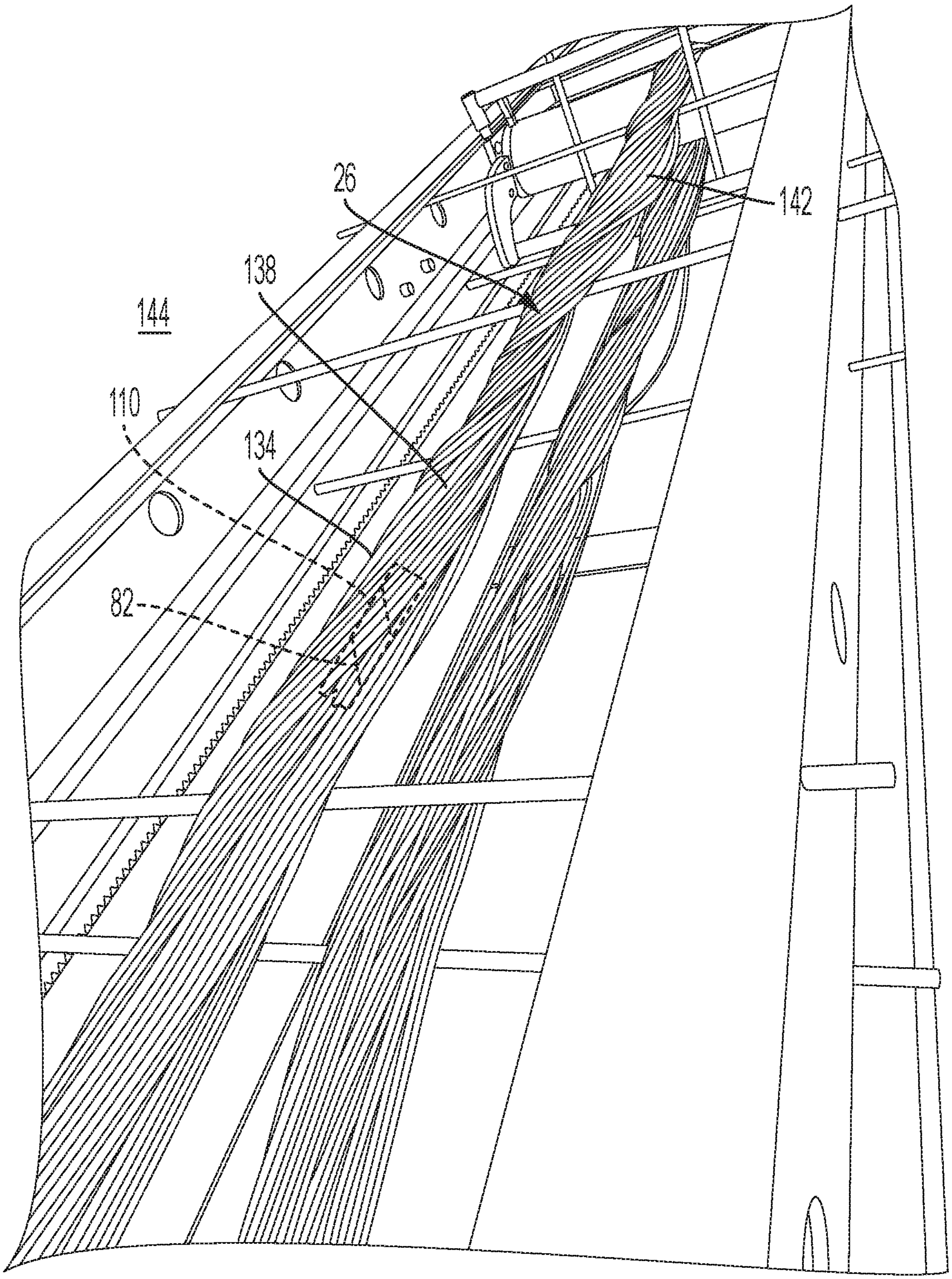
FIG. 11 is a perspective view illustrating an adjusted circumferential position of a portion of the twisted strands and connection (e.g. tying knots) between ends of the base strands and ends of added body strands.

As the drive roller 58 is driven, the core 110 (along with the added body strand 18) also spins about the axis of the core 110 (see the change in position between FIGS. 10-11 of the identified section 128). This spinning motion may be caused by a number of factors such as, for example, engagement of the twisted structure with supporting members (e.g., the rollers 58, 74, the support rods 78, the alignment rods 98), the tension in the twisted structure, etc.

With this rotational and spinning motion of the core 110, the following body strands 18 mesh with the structure of the core 110 (the spaces/grooves between adjacent strands 14). The body strands 18 are added to the core 110 in a helical path. After introduction, the added body strands 18 become twisted strands onto which additional following rope material is laid.

The process continues until the necessary rope material has been to obtain the selected endless loop 144 and its characteristics. Sufficient material of the body strands 18 may be added to fully cover the core 110. The material of the body strands 18 may form an additional layer 138 over the core 110 such that the endless loop 144 includes a core 110, and any number of additional layers 138.

FIG. 11 illustrates the end of the winding process. The necessary material for the selected endless loop 144 has been added to the machine 22. The form of the endless loop 144 is then completed.

For a sling 26 or a tether 24, as shown in FIG. 11, the free end of each body strand 18 is secured to a free end of a base strand 14 (e.g., by a knot 142 or other securing method or device). In the illustrated embodiment, the temporary securing mechanism 42 (the knot 42) is removed from the ends 114, 118, and a permanent securing mechanism (a knot 142) is applied between the end 114 (the ends of the base strands 14) and the ends 146 of the body strands 18. In other embodiments, for example, with a pre-formed base loop (not shown), a permanent securing mechanism (a knot 142) is applied between an end 146 of the body strands 18 and either the core 110 or the body strands 18. Following the formation of the endless loop 144, the endless loop 144 is removed from the machine 22 by returning or retracting the driven roller 74 to its original relaxed position 130 and reducing the tension on the endless loop 144.

Figure 12:
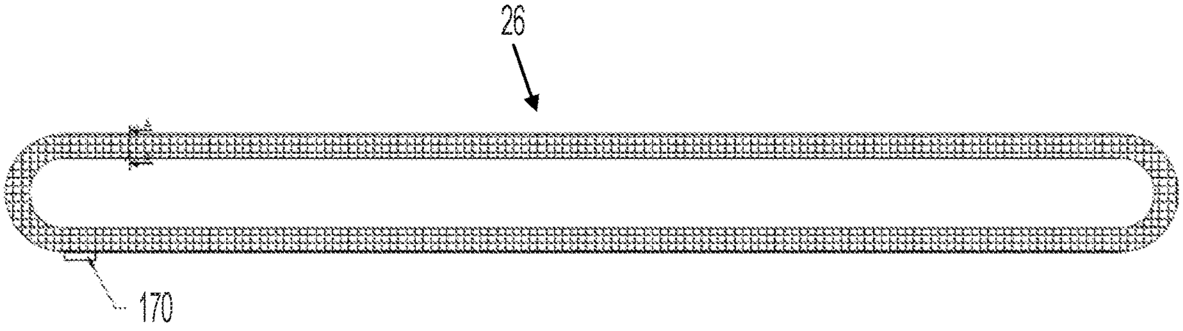
FIG. 12 is a plan view of a round sling manufactured in accordance with the described method.

FIG. 12 illustrates the sling 26 with the endless loop 144 within a cover 146 provided with an indicia 150. The indicia 150 may indicate the location of any discontinuity (e.g., the location of the knot 142) of the sling 26.

Figure 12A:
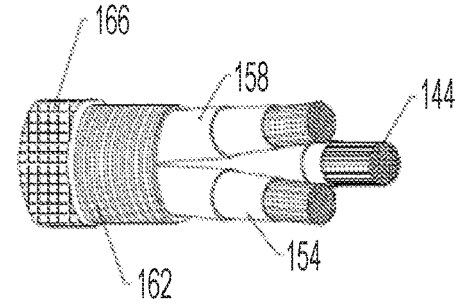
FIG. 12A is a cross-sectional view of the round sling of FIG. 12, taken generally along line A-A in FIG. 12.

As shown in FIG. 12, in the sling 26, the base strands 14 of the core 110 and the body strands 18 combine to form the endless loop 144. A number of liners including a first liner 154, and a second liner 158 may be applied to the endless loop 144. The endless loop 144 may provide enhanced the strength for the sling 26 by being doubled or tripled (as shown in FIG. 12A) over itself. A layer of abrasive protection 162 is applied to the corrugated endless loop 144. A cover 166 may be provided over the abrasive protection layer 162. For a round sling 26 with a discontinuity in the rope strands (e.g., a connection (the knot 142) between the ends 114, 146 of the base and body strands 14, 18, respectively, a connection (the knot 142) of the body strands 18 to the loop/core 110, etc.), an indicator 170 to identify the discontinuity is provided on the cover. A user will avoid this location of the discontinuity for use as a load point.

For a tether 24, after forming the endless loop 144, the endless loop 144 is folded at least once such that multiple portions of the endless loop 144 bear the loads applied to the tether 24. Once the endless loop 144 is folded in the desired configuration, a whipping 174 is applied to the folded sling 24 to secure the sling 24 in the desired configuration.

Figure 13:
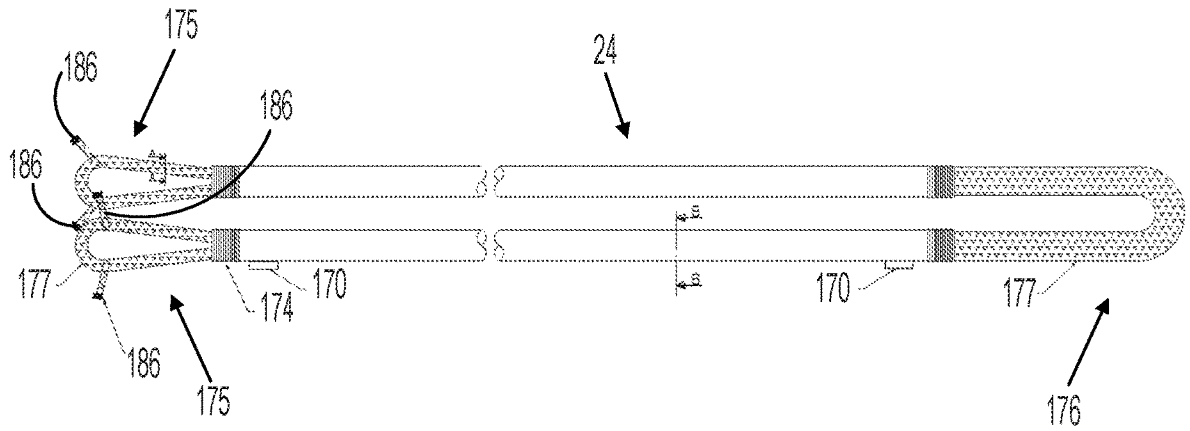
FIG. 13 is a plan view of a hold down tether manufactured in accordance with the described method.
Figure 14:
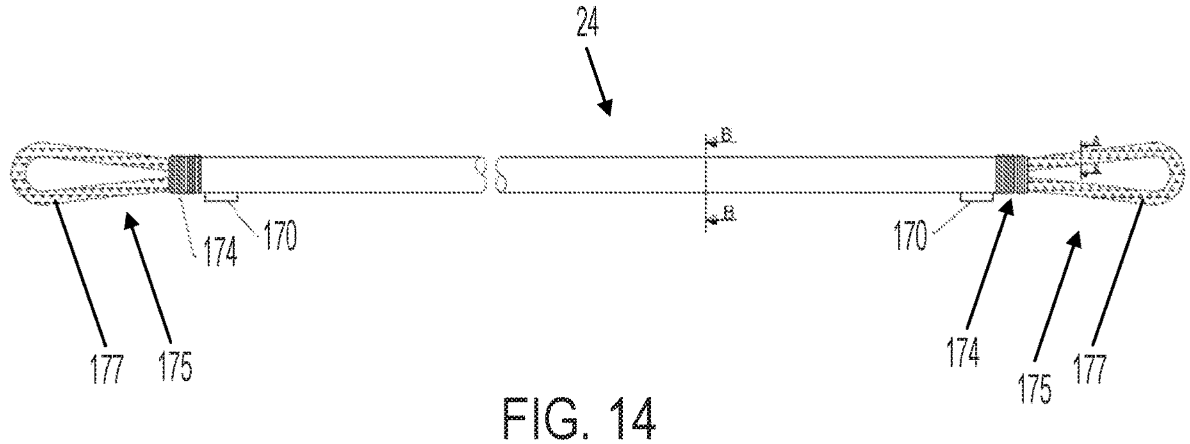
FIG. 14 is a plan view of a vertical tether manufactured in accordance with the described method.
Figure 15:
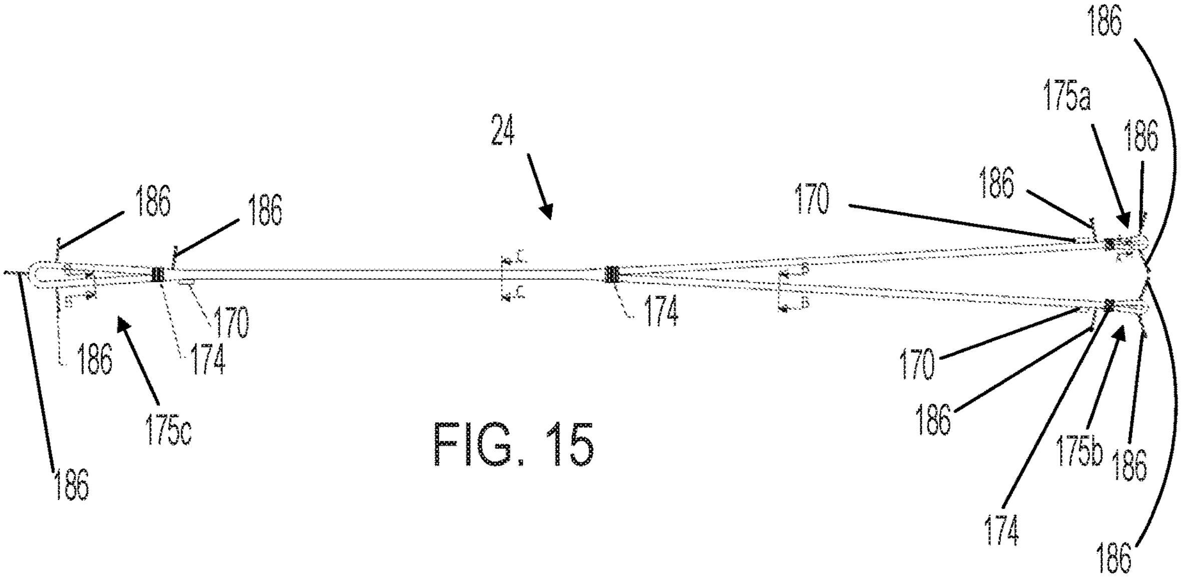
FIG. 15 is a plan view of a Y-shaped tether manufactured in accordance with the described method.

FIGS. 13-15 illustrate various designs of tethers 24 which employ the described manufacturing method. As in the sling 26, each tether 24 includes the endless loop 144 arranged to enhance the strength of the tether 24. Additionally, the tethers 24 include at least one whipping 174 which provides either an eye 175 or a connection point 176 of the tether 24.

Liners 154, 158 and a mud filter 178 are applied to either the endless loop 144 or the multi-looped (e.g., doubled, tripled) endless loop 144. Layers providing abrasion protection 162, 182 are applied. The connection point 176 is covered with a wear pad 177 which provides additional wear resistance to the abrasion protection layers 162, 182. Wear pads 177 may also be applied to the eyes 175.

A cover 166 may be applied to portions of the tether 24. The cover 166 may be fluorescent to promote visibility of the tether 24. Handles 186 are formed or otherwise attached to either the cover 166 or the outermost abrasion protection layer 182. The handles 186 provide contact points to allow remote operated vehicles (ROV) or other structures (e.g., a user or a hook) to handle the tethers 24.

Figure 13A:
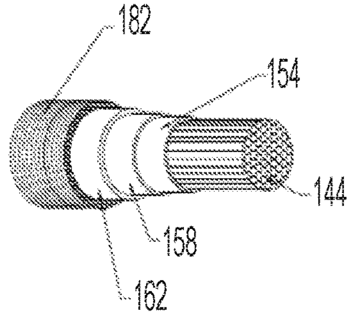
FIG. 13A is a cross-sectional view of the hold down tether of FIG. 13, taken generally along line A-A in FIG. 13.
Figure 13B:
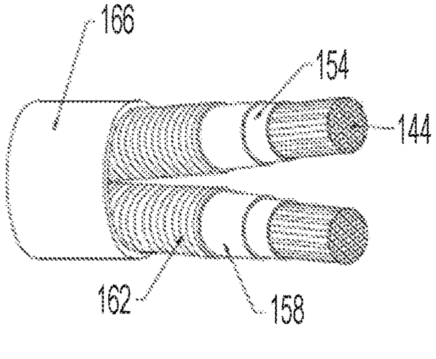
FIG. 13B is a cross-sectional view of the hold down tether of FIG. 13, taken generally along line B-B in FIG. 13.

FIG. 13 illustrates a hold down tether 24 including a connection point 176 with a wear pad 177 and two eyes 175 also provided with wear pads 177. FIG. 13A is a cross-section of one side of an eye 175, and FIG. 13B is a cross-section of one leg of the connection point 176.

Figure 14A:
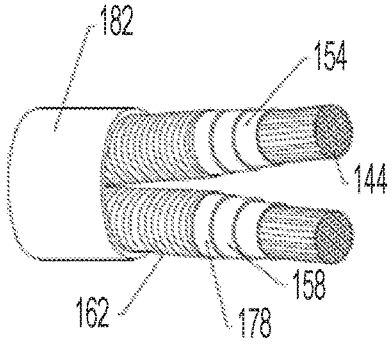
FIG. 14A is a cross-sectional view of the vertical tether of FIG. 14, taken generally along line A-A in FIG. 14.
Figure 14B:
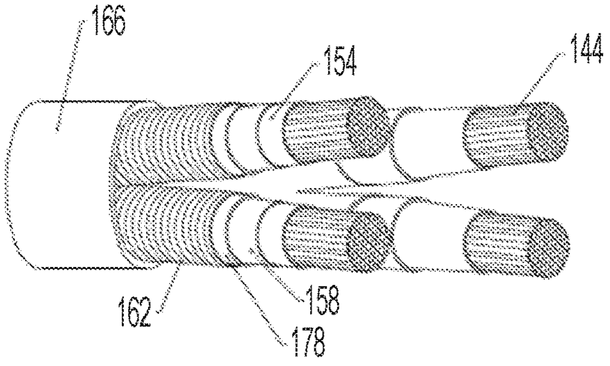
FIG. 14B is a cross-sectional view of the vertical tether of FIG. 14, taken generally along line B-B in FIG. 14.

FIG. 14 illustrates a vertical tether 24 including two eyes 175 each formed by doubling the endless loop 144 with other configurations of tethers 24 with a twisted endless loop 144 being possible. FIG. 14A is a cross-section of one side of an eye 175, and FIG. 14B is a cross-section of the leg between the eyes 175.

Figure 15A:
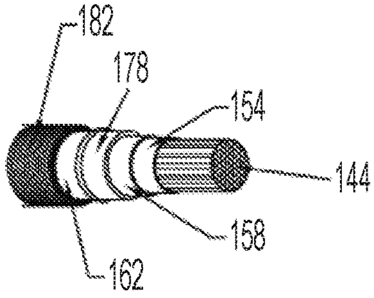
FIG. 15A is a cross-sectional view of the Y-shaped tether of FIG. 15, taken generally along line A-A in FIG. 15.
Figure 15B:
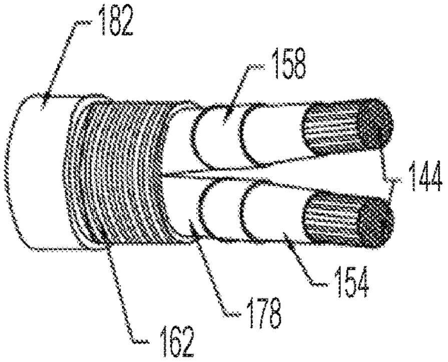
FIG. 15B is a cross-sectional view of the Y-shaped tether of FIG. 15, taken generally along line B-B in FIG. 15.
Figure 15C:
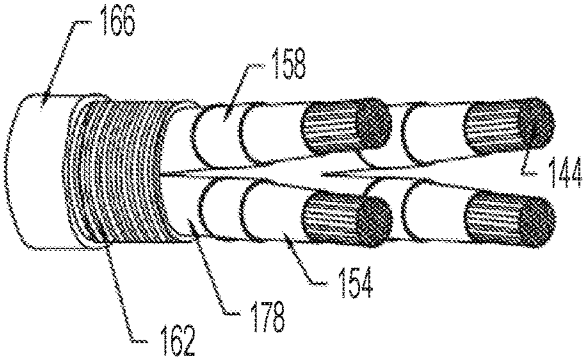
FIG. 15C is a cross-sectional view of the Y-shaped tether of FIG. 15, taken generally along line C-C in FIG. 15.

FIG. 15 illustrates a Y-shaped tether with two eyes 175*a*, 175*b* separated from a third eye 175*c* by a whipping 174*a*. FIG. 15A is a cross-section of one side of the eye 175*a*, and FIG. 15B is a cross-section of one side of the eye 175*c*. FIG. 15C is a cross-section of the leg between the eyes 175*a*, 175*b* and the eye 175*c*.

The “twisted” sling 26 or the “twisted” tether 24 resulting from the manufacturing method may be capable of higher breaking strength when compared to comparable slings and tethers of the same strand material, number of strands, and cover material with the strands laid parallel rather than being twisted. Additionally, the sling 26 and the tether 24 are less susceptible to manufacturing variance (the difference between the lengths of the various strands 14, 18) when compared to comparable parallel-laid slings and tethers. Thus, without the need to use more expensive strand and/or cover material or using additional strands (leading to a higher cross-sectional diameter/weight of the sling), the desired mechanical properties can be achieved.

For example, an increase (e.g., at least about 20% or more (about 22%)) of breaking tenacity was observed in comparing the “twisted” sling 26 with comparable parallel-laid slings. When multiple slings 26 were compared to multiple comparable parallel-laid slings, the utilization variance of the slings 26 was less than (e.g., at least about 20% less than) the utilization variance of the comparable parallel-laid slings. A similar increase in breaking tenacity and decrease in utilization variance of the “twisted” or “cabled” tether 24 is projected when compared with comparable parallel-laid tethers. When comparing parallel slings 26 to cabled slings 26 with similar properties, the cabled slings 26 had increased average breaking strength of at least about 10% and as much as about 36%. Numerous advantages of cabling may be exemplified in the below test results table. One such advantage may be that, in the case of both Winyarn and S1000 strands with a design minimum breaking load of 98 Te, the average breaking strength was below the minimum breaking load for the parallel slings 26, but above the minimum breaking load for the cabled slings 26.

TABLE 1

| | Design | | | | | | Parallel Sling | | |
|---|---|---|---|---|---|---|---|---|---|
| | Minimum Breading Load (Te) | Sling Length (m) | Pin diameter (m) | Fiber Titer | Number of Strands | Number of Turns | Breaking Strength (Te) | Achieved Utilization (cN/dtex) | Average Breaking Strength (Te) |
| Winyarn | 98 | 5 | 1.6 | 65 | 3 | 11 | 72.9 | 9.4 | 81.8 |
| | | | | | | | 88.7 | 11.4 | |
| | | | | | | | 83.7 | 10.8 | |
| S1000 | 98 | 5 | 1.3 | 80 | 3 | 11 | 71.3 | 9.2 | 74.3 |
| | | | | | | | 74.4 | 9.6 | |
| | | | | | | | 77.2 | 9.9 | |
| Winyarn | 350 | 5 | 1.6 | 65 | 10 | 13 | 373.3 | 12.2 | 377.9 |
| | | | | | | | 410.4 | 13.4 | |
| | | | | | | | 350.1 | 11.4 | |
| S1000 | 350 | 5 | 1.3 | 80 | 10 | 13 | 361.4 | 11.8 | 333.0 |
| | | | | | | | 325.3 | 10.6 | |
| | | | | | | | 312.3 | 10.2 | |

| | Parallel Sling | | Cabled Sling | | | | | |
|---|---|---|---|---|---|---|---|---|
| | | | | | Average | | | Increase in Average Breaking Strength, Average |
| | Average Utilization (cN/dtex) | Variance (%) | Breaking Strength (Te) | Achieved Utilization (cN/dtex) | Breaking Strength (Te) | Average Utilization (cN/dtex) | Variance (%) | Utilization (Cabled vs. Parallel) (%) |
| Winyarn | 10.5 | 10 | 107.3 | 13.8 | 111.5 | 14.3 | 8 | 36 |
| | | | 121.9 | 15.7 | | | | |
| | | | 105.3 | 13.5 | | | | |
| S1000 | 9.6 | 4 | 104.1 | 13.4 | 100.0 | 12.9 | 4 | 35 |
| | | | 95.9 | 12.3 | | | | |
| | | | 100.0 | 12.9 | | | | |
| Winyarn | 12.3 | 8 | 425.1 | 13.9 | 417.6 | 13.6 | 3 | 10 |
| | | | 402.4 | 13.1 | | | | |
| | | | 425.3 | 13.9 | | | | |
| S1000 | 10.9 | 8 | 413.1 | 13.5 | 377.2 | 12.3 | 9 | 13 |
| | | | 371.8 | 12.1 | | | | |
| | | | 346.7 | 11.3 | | | | |

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

One or more independent features and/or independent advantages of the invention may be set forth in the following claims:

What is claimed is:

1. A method of manufacturing a rope structure, the method comprising:

providing a plurality of twisted strands such that the plurality of twisted strands is wrapped in a loop around a first roller and a second roller at opposing sides of the loop; and feeding a plurality of body strands onto the loop while connected to the loop such that the body strands are caused to twist and lay upon the plurality of twisted strands by movement of the loop about the first roller and the second roller.

2. A method of manufacturing a rope structure, the method comprising:

forming a loop around a first roller and a second roller, the loop including a plurality of loop strands wrapped around the first roller and the second roller at opposing sides of the loop, forming including applying a twist to the plurality of loop strands to provide a plurality of twisted strands; and feeding a plurality of body strands onto the loop while the plurality of loop strands is connected to the loop such that the body strands are caused to twist and to lay upon the plurality of twisted strands by movement of the loop.

3. The method of claim 2, wherein moving includes driving at least one of the first roller and the second roller.

4. The method of claim 2, further comprising adjusting a relative position of the first roller and the second roller to adjust a tension in the loop.

5. The method of claim 2, after feeding, covering the loop.

6. The method of claim 5, wherein covering includes indicating on a cover a region of discontinuity in the plurality of body strands or in the plurality of loop strands.

7. The method of claim 2, wherein each of the plurality of loop strands has a first end, wherein each of the plurality of body strands has a second end, and wherein the method further comprises connecting each first end to a corresponding second end to form a sling.

8. The method of claim 7, further comprising, after connecting, covering the loop, covering including indicating on a cover a region of a connection between the plurality of body strands and the plurality of loop strands.

9. The method of claim 2, wherein the plurality of loop strands and the plurality of body strands are formed together as continuous strands.

10. The method of claim 2, wherein the plurality of body strands are separate from the loop prior to being connected to the loop.

11. The method of claim 2, wherein the plurality of loop strands are formed of one of a gel-spun ultra-high-molecular-weight polyethylene, a recrystallized high modulus polyethylene, a liquid crystal polyester, a gel-spun polyethylene, a para-aramid, a para-aramid copolymer, a polyamide, a polyester or combinations thereof.

12. The method of claim 2, wherein the plurality of body strands are formed of one of a gel-spun ultra-high-molecular-weight polyethylene, a recrystallized high modulus polyethylene, a liquid crystal polyester, a gel-spun polyethylene, a para-aramid, a para-aramid copolymer, a polyamide, a polyester or combinations thereof.

13. The method of claim 2, wherein the plurality of loop strands is two loop strands.

14. The method of claim 13, wherein the plurality of loop strands comprises ten or fewer loop strands.

15. The method of claim 2, wherein feeding includes feeding at least two body strands.

16. The method of claim 15, wherein feeding includes feeding ten or fewer body strands.

17. The method of claim 2, wherein applying includes applying a twist rate of at least about 0.8 twists per meter.

18. The method of claim 2, wherein applying includes applying a twist rate of up to about 1.5 twists per meter.

19. The method of claim 2, wherein applying includes applying a twist rate of between about 0.8 twists per meter and about 1.5 twists per meter.

20. A method of manufacturing a rope structure, the method comprising:

positioning a plurality of twisted strands around a first roller and a second roller so as to form a loop with the first roller and the second roller at opposing sides of the loop; and feeding a plurality of body strands onto the loop, feeding including, with the plurality body strands connected to the loop, moving the loop about the first roller and the second roller which causes the body strands to twist and lay on the plurality of twisted strands.

* * * * *